Dec. 23, 1952  M. SCHLUMBERGER ET AL  2,623,084
SHOCKPROOF ANGULARLY DEFLECTING INSTRUMENT
Filed Oct. 28, 1947
FIG. 1
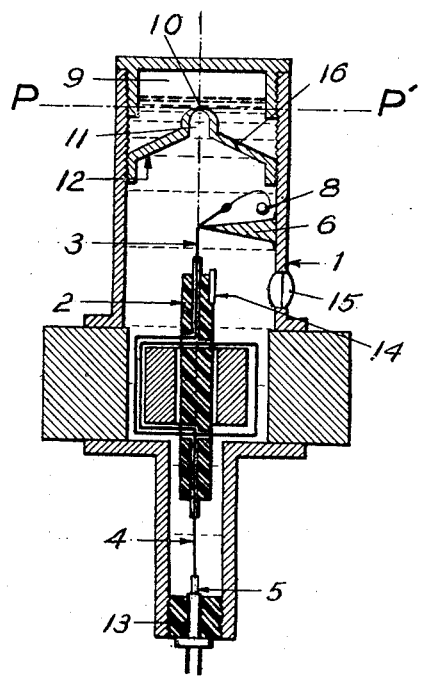
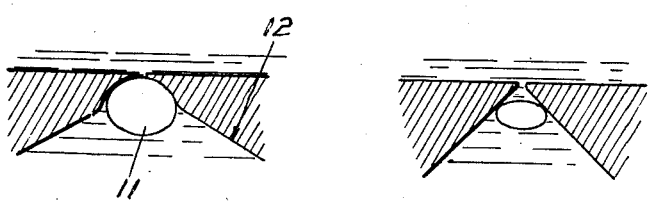
FIG. 2      FIG. 3
INVENTORS:
MARCEL SCHLUMBERGER
MAXIME FELIX BENOIT PICARD
FELIX LEON HILAIRE BARRETEAU
BY:
Campbell, Brumbaugh & Free
Their ATTORNEYS Patented Dec. 23, 1952

2,623,084

UNITED STATES PATENT OFFICE 2,623,084

SHOCKPROOF ANGULARLY DEFLECTING INSTRUMENT

Marcel Schlumberger, Maxime F. B. Picard, and Félix L. H. Barreteau, Paris, France, assignors to Societe de Prospection Electrique Procedes Schlumberger, Paris, France, a corporation of the French Republic Application October 28, 1947, Serial No. 782,582
In France October 29, 1946

5 Claims. (Cl. 171—95)

The present invention has for its object measuring instruments, relays and the like apparatuses including a movable system immersed in a liquid and it relates more particularly to those instruments of the type disclosed wherein the specific weight of the liquid is equal to the mean specific weight of the movable system, the center of gravity of said movable system coinciding at least to a substantial extent with the thrust center of the volume of liquid displaced by said movable system. It is a well-known fact that by reason of this arrangement, the impulses, stresses or translational accelerations to which the instruments may be submitted do not produce any inertia forces in the movable system, whereby said instrument is practically not sensitive to the action of shocks.

In such instruments that are not intended to be held at constant temperature, it is necessary to provide arrangements for allowing the expansion of the liquid in accordance with the variations in temperature.

Such arrangements should be designed however in a manner such that the liquid surrounding the movable system may not be allowed, under the effects of any shocks, to be submitted to any rapid displacement inside the receiver containing it as such displacements would risk damaging the parts forming the instrument.

The present invention has for its object to allow obtaining such a result in a comparatively simple manner.

To this purpose, it consists in making the receiver containing the apparatus communicate with an expansion chamber through the agency of a very small sized port.

The expansion chamber itself may be a chamber with elastic walls allowing an increase in the volume of the liquid, in which case both the receiver containing the movable system and the expansion chamber are entirely filled with liquid. The expansion chamber may also according to a modification be constituted by a chamber partly filled with a gas the compression of which allows the expansion of the liquid. Through the arrangement according to the invention, the liquid is allowed under the action of the variations in temperature to flow out through the port connecting the receiver with the expansion chamber, while on the contrary in the case of a shock no sudden general movement of the liquid inside the receiver may be produced, as the small size of the port prevents any rapid passage of a substantial amount of liquid through said port.

Moreover according to the invention, the port connecting the liquid containing chamber with the expansion chamber is arranged preferably at the upper part of the liquid chamber and opens also preferably at the upper point of said expansion chamber inside a small sized spherical cup of the magnitude of say 4 mm. in diameter. This arrangement constrains the gas bubbles assuming naturally a spherical shape, that may exist in the liquid chamber, to come into intimate contact with the opening of the capillary port without any continuous film of liquid persisting between the liquid chamber and the expansion chamber. Any increase in temperature having for its object to expand the volume of the liquid outside the liquid chamber leads necessarily to the passage of the bubble into the expansion chamber.

Moreover said communication port opens preferably into the expansion chamber at a point located in the vicinity of the volume center of the latter, the volume center being defined as a point located on the axis of the instrument such that the plane perpendicular to said axis at said point may divide the volume of the expansion chamber into two equal parts and, in this case, said expansion chamber should be filled through more than one half thereof. Thus, whatever angular position may be given to the instrument, the port located at the point just described is always immersed in liquid even if the instrument is turned upside down.

Further objects and features of the invention will appear in the following description corresponding to accompanying drawings illustrating diagrammatically by way of example and by no means in a limiting sense a particular form of execution of our invention.

In said drawings:

Fig. 1 is a very diagrammatical cross-section of an immersed galvanometer.

Fig. 2 is a cross-section at a larger scale of the arrangement connecting the two chambers therein and Fig. 3 is a corresponding cross-section of another arrangement shown by way of comparison.

In Fig. 1, I designates a receiver filled with a suitable liquid and containing the movable system, the average specific weight of which is equal to that of the surrounding liquid and the center of inertia of which coincides substantially with the thrust center of the liquid displaced by said movable system. Said movable system shown very diagrammatically at 2 is suspended through extremely fine wires 3 and 4 serving also for the passage of the current feeding the coil of said movable system.

2,623,084

The wire 4 is secured at a point such as 5 to a rod 13 carried inside the lower wall of the receiver 1 and insulated electrically therefrom as illustrated: on the other hand the wire 3 passes in accordance with the invention over a bridge shaped member 6 and is welded to a metal strip 7 forming a spring wound round a rod 8 that is in its turn secured to the receiver wall. This arrangement provides from a mechanical standpoint a constant tensioning of the wires 3 and 4 and it shows the advantage of having only a very small inertia and of offering no substantial resistance to the liquid. From an electric standpoint, the passage of the current through the coil of the movable system 2 is provided between the rod 5 and the body of the instrument through which the circuit is grounded. The movements of the movable system are observed and recorded through a mirror 14 carried by said movable system and adapted to reflect a luminous beam impinging on it through the gap 15 provided to this purpose inside the wall of the receiver 1.

According to the invention, the receiver 1 communicates with the chamber 9 located above it through the agency of a capillary port 10 having a diameter of a few tenths of a millimeter. This capillary port is arranged according to the invention at the upper part of the liquid chamber of the receiver 1 inside a spherical cup 11 of a small diameter, of say a few millimeters, opening into the upper part of the conical surface 12 forming the upper wall of the receiver chamber 1.

On the other hand, said capillary port 10 opens into the expansion chamber 9 in the vicinity of the volume center thereof, the chamber considered being bounded at its lower part preferably by a frusto-conical surface, corresponding to the conical surface 12. The whole arrangement is designed in a manner such that the horizontal plane P—P' passing through the port 2 divides the volume of this chamber into two substantially equal parts. The filling of the instrument is then executed in a manner such that said chamber 9 may be more than half filled with liquid, in other words the level of this liquid should be higher than the plane P—P' when the instrument is upright even for the lowest temperature of use corresponding to a minimum volume of liquid.

Under such conditions the port 10 opens always inside the liquid whatever may be the position of the instrument, even when the latter is turned upside down.

It will be readily ascertained that the movements of the liquid due to any considerable acceleration will always be restricted by reason of the port connecting the receiver 1 with the chamber 9 braking energetically any rapid movement.

The arrangement shows moreover the advantage of allowing an automatic exhausting of the gas bubbles appearing for any reason whatever inside the liquid and adapted when they adhere to the movable system to modify the balance of the latter and to make it vibration-sensitive. Such bubbles have, of course, a tendency to come into the upper part of the chamber.

The port 10 being located at the uppermost point of the receiver at the very point at which the bubbles are collected, any increase in temperature producing an expansion of the liquid expels the gas bubbles into the expansion chamber 9 and this is made easier through the fact that the bubbles mate exactly the shape of the inverted cup 11 into which they are guided by the conical wall 12.

Fig. 2 shows at a larger scale the capillary port and the shape given to the upper part of the liquid-containing chamber. Fig. 2 shows also a gas bubble coming into contact with the spherical surface provided at the corresponding output of the capillary port without any continuous liquid film passing from one chamber into the other. In Fig. 3 is illustrated, in contradistinction, a port of conventional execution formed in a mere conical surface; the bubble shown in association therewith is obviously not in contact with the capillary port and there is a continuous liquid film passing from one chamber into the other so that the liquid current produced by the variations in temperature may then appear without forcing the gas bubble through the port.

Of course, numerous modifications may be brought to the arrangement disclosed without widening unduly the scope of the invention as defined in accompanying claims. In particular, as disclosed hereinabove, it is possible to replace the rigid chamber 9 by an elastic container in which case it may be entirely filled with liquid.

What we claim is:

1. In a measuring instrument, relay and the like apparatus having a system adapted to be displaced angularly about an axis in response to an input signal, the combination of two superposed chambers communicating with one another through a capillary port at the uppermost part of the lower chamber, the lowermost of said two chambers having an upper inside wall tapering upwardly to a central inverted cup-shaped recess providing communication between said port and the interior of said lower chamber, said recess being of a size and shape to accommodate snugly gas bubbles formed in said liquid and directed thereto by said tapering upper inside wall, a mass of liquid filling the lower chamber entirely and adapted to enter the upper chamber through said port, said upper chamber being of substantially constant volume and containing an expansible fluid, and means mounting all of said system in said lower chamber for angular displacement about said axis in response to said input signal and floatingly in the midst of the liquid of the lower chamber.

2. In a measuring instrument, relay and the like apparatus having a system adapted to be displaced angularly about an axis in response to an input signal, the combination of two superposed chambers, a partition separating the two chambers including a frusto-conical portion converging upwardly to a small, central, inverted cup-shaped portion having a capillary port in the upper wall thereof, a mass of liquid filling the lower chamber entirely and adapted to enter the upper chamber through the port, said upper chamber being of substantially constant volume and containing an expansible fluid, and means mounting all of said system in said lower chamber for angular displacement about said axis in response to said input signal and floatingly in the midst of the liquid of the lower chamber.

3. In a measuring instrument, relay and the like apparatus having a system adapted to be displaced angularly about an axis in response to an input signal, the combination of two superposed chambers, a partition separating the two chambers including a frusto-conical portion converging upwardly to a small, central, inverted cup-shaped portion having a capillary port in the upper wall thereof which communicates with the upper expansion chamber in the immediate vicinity of the volume center thereof, said upper chamber being of substantially constant volume and containing an expansible fluid, a mass of liquid filling the lower chamber entirely and adapted to enter the upper chamber through the port and means mounting all of said system in said lower chamber for angular displacement about said axis in response to said input signal and floatingly in the midst of the liquid of the lower chamber.

4. In a measuring instrument, relay and the like apparatus having a system adapted to be displaced angularly about an axis in response to an input signal, the combination of two superposed chambers communicating with one another through a capillary port at the uppermost part of the lower chamber, said port opening into the upper one of said two chambers at about the volume center thereof and said upper chamber being of substantially constant volume and containing an expansible fluid, a mass of liquid filling the lower chamber entirely and at least one-half of the upper expansion chamber, means forming an inverted cup-shaped recess in the central portion of the upper inside wall of said lower chamber of a size to accommodate snugly gas bubbles that may be produced in said liquid, said recess providing communication between the interior of said lower chamber and said port, and means mounting all of said system in said lower chamber for angular displacement about said axis in response to said input signal and floatingly in the midst of the liquid of the lower chamber.

5. In a measuring instrument, relay and the like apparatus having a system adapted to be displaced angularly about an axis in response to an input signal, the combination of two superposed chambers, a partition separating the two chambers including a frusto-conical portion converging upwardly to a small, central, inverted cup-shaped portion having a capillary port in the upper wall thereof which communicates with the upper expansion chamber in the immediate vicinity of the volume center thereof, said upper chamber being of substantially constant volume and containing an expansible fluid, a mass of liquid filling the lower chamber entirely and at least one-half of the upper expansion chamber and means mounting all of said system in said lower chamber for angular displacement about said axis in response to said input signal and floatingly in the midst of the liquid of the lower chamber.

MARCEL SCHLUMBERGER.
MAXIME F. B. PICARD.
FÉLIX L. H. BARRETEAU.

REFERENCES CITED

The following references are of record in the file of this patent:

UNITED STATES PATENTS

| Number | Name | Date |
|---|---|---|
| 498,651 | Hicks | May 30, 1893 |
| 695,262 | Zeal | Mar. 11, 1902 |
| 1,459,212 | Kath | June 19, 1923 |
| 1,800,018 | Hathaway | Apr. 7, 1931 |
| 1,981,266 | Green | Nov. 20, 1934 |
| 2,033,929 | Fischel et al. | June 4, 1935 |

FOREIGN PATENTS

| Number | Country | Date |
|---|---|---|
| 878,079 | France | Sept. 21, 1942 |